US012194772B2

(12) United States Patent
Kecht

(10) Patent No.: US 12,194,772 B2
(45) Date of Patent: Jan. 14, 2025

(54) VALUABLE DOCUMENT SYSTEM

(71) Applicant: GIESECKE+DEVRIENT CURRENCY TECHNOLOGY GMBH, Munich (DE)

(72) Inventor: Johann Kecht, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 17/275,481

(22) PCT Filed: Sep. 10, 2019

(86) PCT No.: PCT/EP2019/025302
§ 371 (c)(1),
(2) Date: Mar. 11, 2021

(87) PCT Pub. No.: WO2020/052812
PCT Pub. Date: Mar. 19, 2020

(65) Prior Publication Data
US 2022/0041005 A1    Feb. 10, 2022

(30) Foreign Application Priority Data

Sep. 14, 2018   (DE) ..................... 10 2018 007 289.5

(51) Int. Cl.
   *G01N 21/956*     (2006.01)
   *B42D 25/382*     (2014.01)
   (Continued)

(52) U.S. Cl.
CPC ....... *B42D 25/382* (2014.10); *G01N 21/6408* (2013.01); *G01N 21/95607* (2013.01);
(Continued)

(58) Field of Classification Search
CPC .............................................. G01N 21/95607
See application file for complete search history.

(56) References Cited

U.S. PATENT DOCUMENTS 7,927,511 B2    4/2011    Giering et al.
8,262,134 B2    9/2012    Schwenk et al.
(Continued)

FOREIGN PATENT DOCUMENTS

AU     2018253806 B2    6/2020
CN       1867459 A     11/2006
(Continued)

OTHER PUBLICATIONS

Search Report from corresponding DE Application No. 102018007289.5, Jun. 6, 2019.
(Continued)

*Primary Examiner* — David P Porta
*Assistant Examiner* — Shun Lee
(74) *Attorney, Agent, or Firm* — Workman Nydegger

(57) ABSTRACT

A value document system, a method for identifying a value document of a value document system, and a luminescent substance set, wherein the value document system includes at least a first value document and a second value document. The first value document has a security feature composed of a combination of at least a first and a second luminescent substance of a first or a second substance class. The second value document has a security feature with at least a first luminescent substance of the first or second substance class. The security feature of the first value document has at least a different intensity ratio of the emission, a different decay time ratio and/or a different decay time sum in two adjacent spectral ranges compared with the security feature of the second value document.

18 Claims, 4 Drawing Sheets

(51) Int. Cl.
*G01N 21/64* (2006.01)
*G07D 7/1205* (2016.01)
*B42D 25/29* (2014.01)
*G07D 7/121* (2016.01)

(52) U.S. Cl.
CPC ........... *G07D 7/1205* (2017.05); *B42D 25/29* (2014.10); *G07D 7/121* (2013.01); *G07D 2207/00* (2013.01)

(56) References Cited

U.S. PATENT DOCUMENTS

| | | | |
|---|---|---|---|
| 9,878,573 B2 | 1/2018 | Giering et al. | |
| 9,987,874 B2 | 6/2018 | Giering et al. | |
| 10,013,835 B2 | 7/2018 | Kecht et al. | |
| 2002/0131618 A1* | 9/2002 | Ahlers | G07D 7/1205 382/101 |
| 2007/0145293 A1* | 6/2007 | Roth | G07D 7/1205 250/461.1 |
| 2007/0202352 A1 | 8/2007 | Giering et al. | |
| 2007/0273141 A1 | 11/2007 | Schwenk et al. | |
| 2007/0295116 A1* | 12/2007 | Le Mercier | C09K 11/7777 73/866 |
| 2008/0116272 A1* | 5/2008 | Giering | G07D 7/1205 235/491 |
| 2008/0252065 A1 | 10/2008 | Giering et al. | |
| 2010/0026991 A1 | 2/2010 | Heer et al. | |
| 2012/0256409 A1 | 10/2012 | Giering et al. | |
| 2013/0015651 A1 | 1/2013 | Lau et al. | |
| 2014/0001351 A1 | 1/2014 | Carr et al. | |
| 2014/0021369 A1 | 1/2014 | Rapoport et al. | |
| 2015/0115177 A1 | 4/2015 | Rapoport et al. | |
| 2015/0191038 A1 | 7/2015 | Giering et al. | |
| 2017/0076530 A1 | 3/2017 | Kecht et al. | |

FOREIGN PATENT DOCUMENTS

| | | |
|---|---|---|
| CN | 1867947 A | 11/2006 |
| CN | 101076835 A | 11/2007 |
| CN | 102026819 A | 4/2011 |
| CN | 102741059 A | 10/2012 |
| DE | 10346630 A1 | 5/2005 |
| DE | 102014016858 A1 | 8/2015 |
| DE | 102008050768 C5 | 11/2017 |
| DE | 102017003746 A1 | 10/2018 |
| EP | 2307206 B1 | 1/2012 |
| EP | 2271504 B1 | 6/2012 |
| EP | 2512821 A1 | 10/2012 |
| WO | 2006024530 A1 | 3/2006 |

OTHER PUBLICATIONS

Office Action from corresponding Indian Application No. 202117017076, Feb. 7, 2022.
Office Action from corresponding Chinese Application No. 201980059573.2, Apr. 2, 2022.
European Office Action from corresponding EP Application No. 19769383.1, Mar. 22, 2023.

* cited by examiner

VALUABLE DOCUMENT SYSTEM

BACKGROUND

The present invention relates to a value document system, comprising at least a first value document and a second value document, a method for identifying a value document of a value document system, and a luminescent substance set for manufacturing a value document system.

Value documents are understood to be sheet-type objects that represent, for example, a monetary value or an entitlement, and therefore should not be arbitrarily manufacturable by unauthorized individuals. They therefore comprise security features that are not easy to manufacture, especially are not easy to copy, and whose presence is an indicator of authenticity, that is, manufacture by an authorized entity. Important examples of such value documents include chip cards, coupons, vouchers, checks and especially banknotes, stocks, stamps, identification cards, credit cards and passports, as well as labels, seals, packaging and other objects for safeguarding value.

As a general rule, value documents are protected by a special marking against any undesired and potentially unlawful duplication. To this end, it has long been known to furnish value documents with luminescent substances that have a specific emission behavior. In particular, using security features composed of a combination of different luminescent substances and determining and analyzing the luminescence decay time to check value documents is known.

Value document systems in which value documents are divided into different classes and differentiated from one another by different security features are, in principle, known. Security features based on two or more luminescent substances that partially overlap in their emission spectrum or excitation spectrum are likewise, in principle, known. For example, EP 2 512 821 B1 shows value documents having substance mixtures composed of oxysulfides, phosphates and vanadates, and EP 2 271 504 B1, substance mixtures.

For example, one value document system according to the background art usually uses multiple different luminescent substances that each have different emission spectra. Here, the luminescent substances are single substances that consist of a doped matrix and exhibit a different emission spectrum according to the composition of the matrix. The emission spectrum is detected by a sensor across multiple spectral channels and, from this, a conclusion reached on the substance class used. The separation into different value document classes is then done by assigning said substance classes, if applicable with the aid of the detected luminescence decay times.

The documents of the background art point out possibilities for checking the authenticity of value documents and safeguarding them. In the check, the presence of the corresponding security feature is checked and the authenticity of the value document extrapolated based on the check results.

SUMMARY

Accordingly, it is one object of the present invention to increase the security of value documents, especially without, in doing so, greatly increasing the complexity or manufacturing costs of the sensors needed for checking the authenticity.

A value document system according to the present invention comprises at least two value documents, namely at least a first value document and a second value document.

The first value document comprises a security feature composed of a combination of at least a first and a second luminescent substance. The first luminescent substance of the security feature of the first value document is a luminescent substance of a first substance class and the second luminescent substance of the first value document is a luminescent substance of a second substance class. Moreover, the first and second luminescent substance of the security feature of the first value document have partially overlapping emission spectra. Furthermore, the first and second luminescent substance of the security feature of the first value document have a decay time of less than 5 ms.

The second value document comprises a security feature having at least a first luminescent substance. The first luminescent substance of the second value document belongs to the first substance class or the second substance class. The decay time of the first luminescent substance of the second value document is a maximum of 5 ms.

The first and second luminescent substance of the security feature of the first value document are formed in such a way that their emission spectra partially overlap and the primary emission range formed by the overlapping emission spectra is dividable into two different, directly adjacent spectral ranges. Here, the two adjacent spectral ranges, namely the first spectral range A (from $\lambda_{A1}$ to $\lambda_{A2}$) and the second spectral range B (from $\lambda_{B1}$ to $\lambda_{B2}$), are each larger than 50 nm and smaller than 500 nm, and at least one of the two adjacent spectral ranges encompasses at least a portion of the emission of the first and second luminescent substance of the security feature of the first value document.

The emission of the security feature of the second value document is at least partially, that is, with at least 1% of its intensity, in at least one of the adjacent spectral ranges A, B. The total intensity $I_A^{W2}+I_B^{W2}$ of the emission of the security feature of the second value document is preferably similarly great in the spectral ranges A and B as the total intensity $I_A^{W1}+I_B^{W1}$ of the emission of the security feature of the first value document, that is, $$0,1<(I_A^{W2}+I_B^{W2})/(I_A^{W1}+I_B^{W1})<10.$$

Here, $I_A^{W1}=\int_{\lambda A1}^{\lambda A2} I_{ges}^{W1'}(x)dx$, $I_B^{W1}=\int_{\lambda B1}^{\lambda B2} I_{ges}^{W1'}(x)dx$, $I_A^{W2}=\int_{\lambda A1}^{\lambda A2} I_{ges}^{W2'}(x)dx$ and $I_B^{W2}=\int_{\lambda B1}^{\lambda B2} I_{ges}^{W2'}(x)$, with $I_{ges}^{W1'}(x)$ and $I_{ges}^{W2'}(x)$ being the emission spectrum of the first and second value document, respectively. In one preferred embodiment, $I_A^{W1}$, $I_B^{W1}$, $I_A^{W2}$ and $I_B^{W2}$ refer to a certain, especially the same, time of measurement.

The security feature of the second value document has a different intensity ratio of the emission, a different decay time ratio and/or a different decay time sum in the spectral ranges A, B compared with the security feature of the first value document. A coding of the security feature and/or a value document identifier of the first and/or second value document is assigned to the different intensity ratio of the emission, the different decay time ratio and/or the different decay time sum in the spectral ranges A, B of the first and second value document. Here, it holds that:

The intensity ratio of the emission U of a security feature of the first or second value document is the quotient of the total intensity of the corresponding luminescent substances in the spectral ranges A and B:

$$U_{AB}=I_A/I_B$$

The decay time ratio V of a security feature of the first or second value document is the quotient of the respective total decay times $\tau_A$ and $\tau_B$ in the spectral ranges A and B:

$$V_{AB}=\tau_A/\tau_B$$

Here, $\tau_A$ is a measure of the decay time of $I_A$, and $\tau_B$ a measure of the decay time of $I_B$. To determine $\tau_A$ or $\tau_B$, for example, a quotient of the values of $I_A$ or $I_B$ can be determined at two times a mathematical function can be adapted to the temporal progression of $I_A$ or $I_B$, or it can be determined at what time $I_A$ or $I_B$ falls below a specified threshold value.

The decay time sum S is the sum of the total decay times $\tau_A$ or $\tau_B$ in the two spectral ranges A and B of a security feature of the first and/or, if applicable, of the second value document:

$$S_{AB} = \tau_A + \tau_B$$

Here, the different security features of the value document system differ in their intensity ratio U and/or in their decay time ratio V and/or in their decay time sum S.

The first substance class comprises luminescent substances having a doped garnet structure, especially yttrium aluminum garnets (YAG), lutetium aluminum garnets (LuAG), gadolinium gallium garnets (GGG), gadolinium scandium gallium garnets (GSGG), yttrium scandium gallium garnets (YSGG), calcium niobium gallium garnets (CNGG), gadolinium scandium aluminum garnets (GSAG), calcium lithium niobium gallium garnets (CLNGG), transition-metal-containing garnet structures, such as yttrium iron garnets (YIG) or other variants or mixed variants of such garnet structures. The second substance class comprises luminescent substances having doped rare earth oxysulfide, doped rare earth phosphate or doped rare earth vanadate.

The rare earth phosphates are explicitly orthophosphates of one or more trivalent rare earth cations X, that is, $XPO_4$, in contrast to other phosphates, such as pyrophosphates, polyphosphates of the type $X(PO_3)_3$, ultraphosphates of the type $XP_5O_{14}$, and additional other phosphates used in the background art as a matrix for luminescent substances.

Likewise, analogously, the rare earth vanadates are explicitly orthovanadates of one or more trivalent rare earth cations X, that is, $XVO_4$.

Suitable rare earth oxysulfides include, for example, lanthanum oxysulfides, yttrium oxysulfides, gadolinium oxysulfides, lutetium oxysulfides and mixed oxysulfides based on these. Suitable rare earth phosphates include, for example, lanthanum phosphates, yttrium phosphates, gadolinium phosphates, lutetium phosphates and mixed phosphates based on these. Suitable rare earth vanadates include, for example, lanthanum vanadates, yttrium vanadates, gadolinium vanadates, lutetium vanadates and mixed vanadates based on these.

According to the background art, numerous matrices are known for inorganic luminescent substances. For example, oxides, especially 3- and 4-valent oxides such as titanium oxide, aluminum oxide, iron oxide, boron oxide, yttrium oxide, cerium oxide, zirconium oxide, bismuth oxide, as well as more complex oxides, such as perovskites, including yttrium aluminum perovskite, lanthanum gallium perovskite; spinels, including zinc aluminum spinels, magnesium aluminum spinels, manganese iron spinels; or mixed oxides such as ITO (indium tin oxide); oxyhalogenides and oxychalcogenides, especially oxychlorides such as yttrium oxychloride, lanthanum oxychloride; sulfides and other chalcogenides, such as zinc sulfide, cadmium sulfide, zinc selenide, cadmium selenide; sulfates, especially barium sulfate and strontium sulfate; earth alkali phosphates, especially barium phosphate, strontium phosphate, calcium phosphate, and more complex phosphate-based compounds, such as apatites, including calcium hydroxyapatites, calcium fluorapatites, calcium chlorapatites; or spodiosites, including, for example, calcium fluorospodiosites, calcium chlorospodiosites;

silicates and aluminosilicates, especially zeolites, such as zeolite A, zeolite Y; zeolite-like compounds, such as sodalites; feldspars, such as alkali feldspars, plagioclases;

additional inorganic compound classes, such as germanates, arsenates, niobiates, tantalates, tungstates and aluminates.

However, no inventive value document system having the advantageous properties mentioned can be produced with these substances. This is possible only by selecting the above-mentioned special substance classes having complementary spectral properties, as is described below.

Thus, for the construction of the value document system according to the present invention, arbitrary luminescent substances cannot be combined with one another. Rather, within the scope of the present invention, a targeted selection is necessary in order to combine, in each case, complementary spectral properties in such a way that a plurality of suitable codings is created. Complementary spectral properties means that the different luminescent substances can be differentiated based on their differing spectral properties. This means, for example, that immediately or directly adjacent intensity maxima of luminescent substances that are different from one another differ significantly from one another, by more than 50 nm, with sensors having a resolution of >50 nm.

According to the background art, numerous dopants are known for inorganic luminescent substances, for example the rare earths: Ce, Pr, Nd, Sm, Eu, Gd, Tb, Dy, Ho, Er, Tm, Yb, Lu, and other dopants Bi, Pb, Ni, Sn, Sb, W, Tl, Ag, Cu, Zn, Ti, Mn, Cr and V (or their ions). Here, the dopants are used singly or in combination (e.g. as codoping).

According to the present invention, luminescent substances require at least one dopant from the group Nd, Yb, Er, Tm, Ho. The luminescent substances preferably include at least ytterbium or neodymium or erbium as the dopant, particularly preferably ytterbium or neodymium, since here, due to the wavelength range of the emission, particularly good detectability is given by a simply constructed detector. In addition to the dopant from the group Nd, Yb, Er, Tm, Ho, still other (arbitrary) dopants are preferably present. Here, the dopants from the group Nd, Yb, Er, Tm, Ho act as emission centers of the luminescent substances described here. Preferably Nd, Yb or Er are the emission centers of the luminescent substances, particularly preferably Nd or Yb. Here, the term "emission center" means that the emission of the luminescent substance originates from said dopant. For example, in a typical energy transfer from neodymium (Nd) to ytterbium (Yb), the ytterbium forms the emission center when the neodymium is excited, since here, the emission of the neodymium is suppressed by the energy transfer. Likewise, for example in an erbium-doped matrix in which praseodymium was added as codoping to adjust the decay time without itself luminescing significantly, the luminescence-emitting erbium forms the emission center.

Inventive security features of the first value document are therefore a substance mixture made up of at least one luminescent substance from the first substance class and at least one luminescent substance from the second substance class, which are described below.

In one embodiment, the security feature of the first and/or, if applicable, second value document can be a mixture composed of luminescent substances of the first and/or second substance class, with, in addition, further luminescent substances being included that belong to neither the first nor the second substance class. In this way, the spectral progression of the emission spectrum can be finely adjusted, or the number of codings further increased.

The luminescent substances preferably exhibit substantially (<5% rel. intensity) no additional anti-Stokes emission. In this way, it is prevented, for instance, that the security feature can be made visible by infrared laser pointers or similar devices for detecting upconversion.

By combining the at least first and second luminescent substance in the security feature of the first and, if applicable, second value document, a high number of codings can be generated. Based on the coding formed, the security feature can be assigned to a value document class, for example a denomination and/or a value. In other words, it is checked not only for a certain security feature on a value document, but whether the value document corresponds to the coding or the value document class that is identified and assigned by the detected security feature. The value document identifier or the coding of the security feature of the first and second value document can be assigned to a banknote value and/or a country of manufacture, or also, especially in combination with other information, attest the authenticity of the first or second value document.

The security feature of the first value document is at least the first and second luminescent substance in a definable or defined ratio in combination (preferably in the form of a mixture). This means that the first and second luminescent substance of the first value document is present in the security feature in a definable or defined relative mole fraction with respect to the total amount of the luminescent substances. The security feature can thus be unambiguously identified.

The at least first and second luminescent substance of the first value document and the at least first luminescent substance of the second value document can be introduced into or affixed to the first or second value document in a variety of ways. They can, for example, be added to a paper pulp or plastic composition to manufacture the first or second value document, or to a printing ink to print on the first or second value document. It is also conceivable to provide the first and/or second luminescent substance of the first value document or the at least first luminescent substance of the second value document on the value document as, for example, a non-visible coating. The first and second luminescent substance of the first value document and/or the at least first luminescent substance of the second value document can also be provided on or in a substrate material, for example consisting of plastic, that is embedded in a paper pulp or plastic composition for manufacturing the value document. The substrate material can, for example, be formed in the form of a security or identification thread, a colored fiber or planchette. The substrate material can also be affixed to the value document, for example in the form of a sticker, for example to take a product security measure. In principle, any arbitrary design of the substrate material is possible.

The at least first and second luminescent substance of the first value document and the at least first luminescent substance of the second value document have single-substance emission spectra. The first and second luminescent substance of the first value document have different single-substance emission spectra that overlap in a wavelength range (referred to below as the overlap range ÜB, see FIG. 1A). Here, the two emission spectra of the first and second luminescent substance of the first value document overlap partially but not completely. Dependent on its relative mole fraction, in the overlap range ÜB, the first or second luminescent substance of the first value document contributes with the intensity of its emitted luminescent radiation to the total intensity of the security feature. The term "total intensity" always refers to a summary intensity of the luminescent radiations, excited by a (same) excitation pulse and detected at a same time at a certain wavelength or in a certain wavelength range, of the luminescent substances included in combination in the security feature. Accordingly, the term "total decay time" refers to the decay time of the total intensity, in contrast to an individual decay time of the individual intensity of a luminescent substance.

The terms "integrated total intensity" and "integrated individual intensity" refer to the spectral integral of the respective intensity over a specified range.

In a measurement of the total intensity with a typical resolution of preferably 20 nm, an uninterrupted "primary emission range" PEB results, which is defined as follows (see FIG. 1B, range between the dotted marking lines):

The maximum of the total intensity is located in the primary emission range.

The primary emission range is the largest continuous wavelength range in which the total intensity does not fall below 10% of the maximum.

The background of this definition is that, for an efficient, quickly readable security feature, it is necessary that the main emission be evaluated and not exclusively, for example, a weaker secondary emission that is potentially also present. Furthermore, the determination of the decay time in ranges of little intensity results in a higher measurement inaccuracy or an elevated signal-to-noise ratio such that, in a quick measurement, no reliable value for the decay time can be determined for said sub-ranges.

The "degree of overlap" in the primary emission range of two single-substance emission spectra of two luminescent substances that are different from one another is defined as follows:

First, the single-substance emission spectra I'(x) and J'(x), whose curves result when the individual intensities I' and J', respectively, are plotted against the wavelength (x), are normed to the same surface area. In other words, $$I(x)=I'(x)/\int_{\lambda 1}^{\lambda 2} I'(x)dx, J(x)=J'(x)/\int_{\lambda 1}^{\lambda 2} J'(x)dx.$$

In this case, the norming was done to the surface area 1. $\lambda 1$ is the lower threshold wavelength of the primary emission range and $\lambda 2$ is the upper threshold wavelength of the primary emission range.

The degree of overlap is then defined by the following formula:

$$\ddot{U}berlappungsgrad = \frac{2\int_{\lambda 1}^{\lambda 2} I(x) \cdot J(x)dx}{\int_{\lambda 1}^{\lambda 2} I(x)dx + \int_{\lambda 1}^{\lambda 2} J(x)dx}$$

It indicates the relative fraction of the spectral overlap within the primary emission range between the single-substance emission spectra of the respective luminescent substances.

The degree of overlap of the emission spectra of two luminescent substances is a parameter that is independent of the relative intensity and the ratio of the luminescent substances and that refers solely to the shape-dependent overlap of the respective single-substance emission spectra. To determine the degree of overlap, emission spectra measured at room temperature are used, which were measured with a typical detector resolution of preferably 20 nm.

According to the present invention, the first and second luminescent substance of the first value document are formed in such a way that their single-substance emission spectra have a degree of overlap of less than 80%, preferably less than 65%, particularly preferably less than 50%, and a degree of overlap of more than 5%, preferably more than 10%, particularly preferably more than 20%.

With a certain combination of luminescent substances, value document systems that include security features composed of such luminescent substances that overlap in their emission can acquire particularly advantageous properties. Surprisingly, it was discovered that, by specifically combining the first luminescent substance and second luminescent substance, it is possible to develop systems composed of substance mixtures that possess advantageous properties, in particular, the complementary emission spectra of the first and second substance classes produce, when combined, a high number of easily resolvable codings with simultaneously high counterfeit security. Said codings can also be reliably differentiated with sensors that do not work with high spectral resolution with a plurality of spectral channels and thus have a lower complexity.

For the value document systems according to the present invention, instead of a plurality of different single luminescent substances, each having different emission spectra, substance mixtures composed of luminescent substances that overlap in their emission are used. In this way, depending on the material choice of the first and second luminescent substance and their ratio, a plurality of emission spectra can be produced that, for example, are analogous to those of single substances that differ in each case, or also different from those of single substances and possess additional properties.

With the at least two different luminescent substances, namely the first and the second luminescent substance of the first value document, it is possible, with a view to different mixing ratios in the security feature, to produce a plurality of security features. It is thus possible to better use scale effects at manufacture, since the first and second luminescent substance of the first value document, which, here, can be included in all mixtures, are required, overall, in significantly larger amounts than if corresponding codings were formed having a plurality of single luminescent substances.

A further advantage results from the fact that substances having a specific emission spectrum are often accessible only by choosing exotic matrices. Here, "exotic" means, for example, matrices having uncommon structures, whose existence was proven academically but that are laborious to manufacture and are therefore unsuitable for commercial use. For example, the manufacture of such matrices requires uncommon reaction conditions, costly educts or numerous synthesis steps. And although such substances can have uncommon and unique emission spectra, others of their properties, such as a low chemical stability to acids or bases, are often not suitable for use as a security feature.

If the emission spectrum of the security feature of the first value document according to the present invention is composed of the single-substance emission spectra of the first and second luminescent substance, deliberate use can be made of substances having particularly advantageous properties: said properties comprise, for example, a high chemical stability, a high luminescence efficiency, a simple synthesis and cost-effective feedstocks. Likewise, new emission spectra can be produced that do not correspond to any known single substance. In particular, emission spectra can be specifically adapted to achieve, for example, as good a resolvability of different codings as possible.

A third advantage results from combining the properties of the substances that overlap in emission, which results in emission spectra having novel temporal characteristics that are not accessible via single substances. Among these are, for example, mixtures of substances having different decay times, in which the detected emission spectrum changes in a defined manner over time.

One embodiment can provide that at least two, preferably at least three security features of the value document system are designed in such a way that, directly after excitation, they each exhibit different emission spectra, but exhibit the same emission spectrum at, in each case, different times after excitation. This is achieved by suitably combining the first and second luminescent substance of the security feature with, in each case, different decay times in the spectral ranges A and B. In this case, the individual security features can be differentiated in that, after excitation, the respective time is determined until a specified target spectrum is achieved.

The advantages of the present invention reveal themselves especially in the machine measurement of value documents in high-speed sensors and the methods suitable for this, in contrast to methods that are used, for example, in a forensic measurement of a single banknote in a lab. Here, the banknotes typically move through the machine at up to 12 meters per second, such that special demands must be placed on the detection methods and substance properties. Furthermore, with security features according to the present invention, it is possible to differentiate the individual codings of the value document system with a simple sensor that, for example, covers the primary emission range with only two or only three detection channels.

In one embodiment, the security feature of the second value document comprises a second luminescent substance, the first luminescent substance of the second value document belonging to the first substance class, and the second luminescent substance of the second value document belonging to the second substance class. The first luminescent substance and the second luminescent substance of the second value document have partially overlapping emission spectra. Moreover, the first and second luminescent substance of the security feature of the second value document are formed in such a way that their primary emission range of the partially overlapping emission spectra is dividable into at least two different, directly adjacent spectral ranges A, B, the at least two adjacent spectral ranges being greater than 50 nm and less than 250 nm, at least one of the at least two adjacent spectral ranges comprising at least one part of the emission of the first and second luminescent substance of the security feature of the second value document (that is, the percentage of the integral over the emission range that lies within the spectral sensitivity range of the detection channels in question is greater than zero), and the spectral ranges A, B of the security feature of the second value document being identical with those of the security feature of the first value document.

Thus, in said embodiment, both the security feature of the first and that of the second value document consist of substance mixtures of substances of the first and second substance class having partially overlapping emission spectra. In this way, the counterfeit security, for example, is further increased, and the security feature of the second value document likewise acquires the already described advantages of such substance mixtures compared with the use of single substances: For example, new emission spectra can be produced that do not correspond to any known single substance. A further advantage results from combining the properties of the substances that overlap in emission, which results in emission spectra having novel temporal characteristics that are not accessible via single substances.

In one preferred embodiment, at least two, preferably at least three, particularly preferably at least four value documents of the value document system comprise a security feature that consists of a substance mixture of luminescent substances of the first substance class and of the second substance class having partially overlapping emission spectra.

Analogously to the security feature of the first value document having a first and a second luminescent substance, the intensity ratio U of the emission of the security feature of the at least second value document is then the quotient of the total intensity of the first and second luminescent substance of the security feature of the second value document in the spectral ranges A, B. The decay time ratio V of the security feature of the second value document is the quotient of the total decay times $\tau_A$ and $\tau_B$ in the spectral ranges A and B, respectively, of the security feature of the second value document, and the decay time sum S of the security feature of the second value document is the sum of the total decay times $\tau_A$ and $\tau_B$ in the spectral ranges A, B of the security feature of the second value document.

The same spectral ranges A, B are preferably always used to differentiate different security features of different value documents of the value document system.

In one embodiment, the first and second luminescent substance of the security feature of the first value document have, in each case, the same decay time as the first and second luminescent substance of the security feature of the second value document, in particular, all luminescent substances having overlapping emission in the two spectral ranges A and B have, in each case, the same decay time. The luminescent substances having overlapping emission are thus chosen in such a way that their decay times are substantially identical, that is, their decay times differ by less than 10%, preferably by less than 5% from one another (with respect to the shortest individual decay time of the luminescent substances).

In this case, the emission spectrum composed of the different luminescent substances acts as the spectrum of a new single substance. What is advantageous in this variant is, for instance, that, at production of security features, the spectral properties can be adjusted without influencing the decay time or the ratio of the decay times in the different spectral ranges. This makes it possible, for instance, to compensate for manufacturing variations or to adapt the spectral properties of the security feature to absorption bands of the substrate or similar.

Furthermore, the measured emission spectrum of a value document suggests to a potential counterfeiter a different substance class with which, however, additional substance properties would then not fit. This increases the counterfeit security.

Preferably, the decay time of the individual luminescent substances of the security features of the first and second value document is at least 0.05 ms. Particularly preferably, the decay time is in a range from 0.05 to 5 ms. Within this range, a good machine-detectability of the decay time in banknote processing machines is ensured. The measurement of shorter decay times is technically complex, and the determination of longer decay times is not possible due to the high speed of the banknotes of up to 12 meters per second in banknote processing machines.

Another embodiment can provide that the first and second luminescent substance of the first value document and, if applicable, of the second value document differ in the decay time by 10% to 50% (with respect to the shortest individual decay time of the luminescent substances). In this case, the spectrum composed of the different luminescent substances appears at first glance or upon superficial analysis like that of a single substance. However, the minor difference can be used to differentiate the security feature, upon precise analysis, from a single substance having the same emission spectrum. In this way, greater protection against counterfeits is achieved, for example.

Another embodiment can provide that the first and second luminescent substance of the first value document and the at least one luminescent substance of the second value document differ in the decay time by at least 50%, preferably by 75% and particularly preferably by more than 100% (with respect to the shortest individual decay time of the luminescent substances). Thus, for a security feature, all luminescent substances having overlapping emission in the two spectral ranges A and B have a sharply different decay behavior, or a sharply different decay time.

In this case, particularly strong protection against imitation is produced, since the decay behavior in the different detector channels of a sensor is strongly dependent on the chosen measurement parameters (size of the detection channel, etc.), which must be known to a potential imitator in order to counterfeit a corresponding security feature. As a further advantage, here, special codings of a value document system can be produced that have the same emission spectrum but differ among themselves in the decay time ratio in the spectral ranges A and B or in different detection channels of a sensor. For example, if two detection channels are used, channel 1 and channel 2, that measure an emission spectrum having, in each case, the same intensity, the following cases can occur:

a) channel 1 detects a higher decay time than channel 2
b) channel 1 and channel 2 detect the same decay time
c) channel 1 detects a lower decay time than channel 2

Thus, value documents can be divided by the sensor via the decay time ratio into three or more classes, for example three different currencies, although they exhibit the exact same emission spectrum.

Furthermore, more complex shapes of the overlap or of the spectral progression are possible. For example, a luminescent substance can not only consist, as depicted schematically, of a symmetrically structured emission band, but in the analyzed range, an asymmetrical band, a main band having a shoulder or multiple bands, such as a main band and multiple secondary bands. Furthermore, the individual luminescent substances themselves can exhibit distinctive features in temporal behavior, for example a measurable buildup behavior with associated buildup time or an atypical progression of the decay curve. In this way, significantly more complex correlations between the observed spectral range and the detected decay time with local minima, local maxima or one or more reversal points are possible.

To imitate the progression of the total decay time of such luminescent substance mixtures, which varies continuously with wavelength, a specific combination of luminescent substances is necessary, since the individual components not only must, in sum, yield the target spectrum, but also must have suitable ranges of spectral overlap and suitable decay time ratios. This complicates imitation considerably.

According to the present invention, by combining at least two luminescent substances having a defined degree of overlap and having specific different decay times, effective protection against imitation can be achieved. Imitation by combining different luminescent substances having other spectral properties is possible here only if the precise measurement parameters, especially the spectral position and shape of the filter curves of the detection channels, the temporal scanning or the temporal progression of the luminescence are known, as well as the algorithm or the chosen measurement parameters for determining the effective decay time.

Through a degree of overlap of the single-substance emission spectra of the luminescent substances of less than 80% and more than 5%, it can be ensured that sufficient variance occurs in the decay time behavior of the total intensity of the luminescent substances and, on the one hand, the presence of a single mixed decay time that is constant over the entire range (corresponding to a degree of overlap of 100%, that is, identical spectral shape of the two emissions) and, on the other hand, the presence of individual, separate emissions having, in each case, constant decay times (corresponding to a degree of overlap of 0%), is advantageously avoided.

The single-substance emission spectra of the luminescent substances and thus the primary emission range preferably lie in a narrow spectral range, that is, for example, a spectral range of less than 300 nm. To this end, in one advantageous embodiment of the value document according to the present invention, the luminescent substances are formed in such a way that immediately or directly adjacent intensity maxima of single-substance emission spectra that are different from one another differ from one another by less than 200 nm, preferably by less than 100 nm. The immediately or directly adjacent intensity maxima of single-substance emission spectra that are different from one another are preferably more than 20 nm, particularly preferably more than 50 nm away from one another to obtain a sufficiently large overlap range for the first or second security feature. In one particularly advantageous embodiment of the present invention, the immediately or directly adjacent intensity maxima of luminescent substances that are different from one another have, in each case, a separation of less than 100 nm and more than 50 nm.

The primary emission range of the luminescent substances preferably lies in the infrared range, that is, between 700 nm and 2000 nm, particularly preferably between 800 nm and 2000 nm.

In one preferred embodiment, the luminescent substances are excited in the infrared range, that is, between 700 nm and 2000 nm, preferably between 800 and 1500 nm.

In a further preferred embodiment, the luminescent substances are excited in the visible spectral range, that is, between 400 nm and 700 nm. An excitement in the infrared range is particularly preferred here.

The emission centers of the luminescent substances are preferably rare earth ions, especially the rare earth ions neodymium (Nd), ytterbium (Yb), erbium (Er), thulium (Tm), and/or holmium (Ho).

In one embodiment of the present invention, the primary emission range of the luminescent substances is in the range from 750 nm to 1100 nm, especially in the range from 800 nm to 1100 nm. In one preferred embodiment of the present invention, the primary emission range is in the range from 900 nm to 1100 nm. In said ranges, luminescent substances having neodymium and/or ytterbium, for example, can be used to advantage.

In a further embodiment of the present invention, the primary emission range is in the range from 1500 nm to 1900 nm, preferably in the range from 1500 nm to 1700 nm. In said ranges, luminescent substances having erbium and/or thulium, for example, can be used to advantage. Alternatively, the primary emission range can be in the range of 1700 nm to 1900 nm. In said ranges, luminescent substances having thulium and/or holmium, for example, can be used to advantage.

In one embodiment, the luminescent substances for a value document system according to the present invention, having overlapping emission, have in each case the same rare earth ion as the emission center. Preferably, the luminescent substances having overlapping emission have only a single rare earth ion from the group {Nd, Yb, Er, Tm, Ho}. For example, one, for example the first of the luminescent substances, includes only erbium and none of the others from the group, and a further luminescent substance, for example the second luminescent substance, likewise includes only erbium and none of the others from the group. This ensures, for instance, that two different, separate value document systems do not include, in whole or in part, the same rare earth ions and thus interact with one another and interfere with one another. Furthermore, it prevents the individual components of the substance mixture being able to be analyzed separately via a separate excitation of the other rare earth ions.

In one preferred embodiment, the luminescent substances having overlapping emission have Nd as the dopant and do not include any of the rare earths Yb, Er, Tm or Ho as the dopant.

In a further preferred embodiment, the luminescent substances having overlapping emission have Yb as the dopant and do not include any of the rare earths Nd, Er, Tm or Ho as the dopant.

In a further preferred embodiment, the luminescent substances having overlapping emission have Er as the dopant and do not include any of the rare earths Nd, Yb, Tm or Ho as the dopant.

When said elements are used, particularly good detectability by a simply structured detector is given due to the wavelength range of the emission.

Here, the term "as the dopant" means the common use of such elements in the manufacture of luminescent substances, with typically 0.1% to 50% of the occupiable positions of the matrix being occupied by the dopant. What is not meant are minor contaminations with the corresponding elements, which can be co-introduced, for example, depending on the chosen purity of the educts at manufacture of the luminescent substance.

In one embodiment, the luminescent substances for a value document system according to the present invention having overlapping emission have, in each case, different rare earth ions as the emission center, or have mixtures of the rare earth ions of the group {Nd, Yb, Er, Tm, Ho}.

In this way, more complex effects, for example energy transfer systems or specific modification of the spectral behavior, can be used.

In one preferred embodiment, the luminescent substances having overlapping emission have Nd and/or Yb and/or Er as the dopant and do not include any of the rare earths Tm or Ho as the dopant.

In one preferred embodiment, the luminescent substances having overlapping emission have Nd and/or Yb as the dopant and do not include any of the rare earths Er, Tm or Ho as the dopant.

When said elements are used, particularly good detectability by a simply structured detector is given.

The emission of the luminescent substances preferably occurs substantially in the primary emission range. This means that, besides the partially overlapping emission bands, no further emission bands occur in other spectral ranges. In this way, it is advantageously avoided that, within the scope of an imitation, additional non-overlapping emission bands that occur in isolation can be analyzed separately to reach conclusions regarding the emission bands of the primary emission range. To this end, in one preferred embodiment of the present invention, the luminescent substances are formed in such a way that at least 80%, especially at least 90% of the individual intensities are emitted in the primary emission range.

In one particularly preferred embodiment, the different codings of the value document system are generated by combining as few and as similar luminescent substances as possible, as explained in the following. In this way, a particularly high level of protection against analysis and imitation of the security feature is given.

The first and/or second luminescent substance of the security feature of the first value document preferably comprise the same matrix as the first luminescent substance and/or the, if applicable, second luminescent substance of the security feature of the second value document.

The value document system preferably comprises at least a third value document whose security feature comprises at least one luminescent substance that comprises the same matrix as the first or second luminescent substance of the security feature of the first value document, but differs in its doping and/or its decay behavior.

Preferably at least 3, particularly preferably at least 4, more preferably at least 5 different codings of the value document system consist of security features having the following properties: the security features consist exclusively of substance mixtures having a first matrix and a second matrix, the first and/or second matrix being able to have different dopings and/or different decay behaviors.

For example, the first matrix can be a lutetium aluminum garnet (LuAG) and the second matrix an yttrium vanadate (YVO$_4$) that, for example, are doped with different amounts of neodymium to produce a fast decay time behavior (S) or a slow decay time behavior (L). For the different codings of the value document system are then created, for example, the following security features:
  4 security features composed of different mixing ratios of LuAG:Nd (S) and YVO$_4$:Nd (S)
  4 security features composed of different mixing ratios of LuAG:Nd (S) and YVO$_4$:Nd (L)
  4 security features composed of different mixing ratios of LuAG:Nd (L) and YVO$_4$:Nd (S)
  4 security features composed of different mixing ratios of LuAG:Nd (L) and YVO$_4$:Nd (L)

Thus, a value document system can be created having 16 codings that, however, are very similar to each other and are thus very difficult for a counterfeiter to analyze and reproduce.

In one preferred embodiment, different codings of the value document system differ from one another by at least 20%, preferably at least 50% in at least one of their U, V or S values, with respect to the lower value. This ensures that a good differentiation of the individual codings is possible.

In a further preferred embodiment, different codings of the value document system differ from one another by at least 20%, preferably at least 50% in their V values.

In a further preferred embodiment, different codings of the value document system differ from one another by at least 20%, preferably at least 50% in their U values.

In a further preferred embodiment, different codings of the value document system differ from one another by at least 20%, preferably at least 50% in at least two of their U, V and S values.

This ensures that codings are not resolved exclusively using S values since, here, a lower counterfeit protection is given than when, instead or in addition, the U or V values differentiate between codings.

In a further embodiment of the value document system according to the present invention, the luminescent substances are formed in such a way that the individual decay times of the luminescent substances are in the range from 50 µs to 5000 µs, preferably in the range from 100 µs to 1000 µs. The individual decay time of a first luminescent substance is preferably in the range from 100 µs to 200 µs and the individual decay time of a second luminescent substance in the range from 400 µs to 1000 µs, permitting particularly good protection against imitation of the security feature to be achieved.

In particular, according to the present invention, luminescent substances having decay times over 5 milliseconds are not usable in machine analysis on high-speed banknote sensors since, here, the banknote is transported with speeds of up to 12 meters per second. A detection or resolution of such long decay times cannot be carried out since the banknote moves out of the measuring field before the luminescence intensity has dropped noticeably due to the decay time.

Furthermore, the measurement of very short decay times is technically complex.

Preferably, none of the luminescent substances has a decay time of more than 5000 µs, particularly preferably of more than 2000 µs, especially preferably of more than 1000 µs. This permits a more accurate measurement of the decay time also at high transportation speeds. Preferably, none of the luminescent substances has a decay time of less than 50 µs, particularly preferably of less than 80 µs, especially preferably of less than 100 µs. For lower decay times, a differentiation of background fluorescences, for example of organic impurities, becomes increasingly difficult.

According to the present invention, inorganic luminescent substances are used. According to the present invention, luminescent substances that use, in each case, as the matrix, an inorganic host lattice that is doped with at least one dopant chosen from the rare earth metals (or their ions), are particularly preferred.

The adjusting of decay times of inorganic luminescent substances is known in the background art. For example, an adjustment can occur through the amount of dopant (concentration quenching). Alternatively, codopings (quenchers) can be used, certain rare earths such as samarium, praseodymium or dysprosium typically being used, or certain transition metals, such as iron(III) ions, but also numerous other elements. Alternatively, the decay time can be influenced via the grain size of the luminescent substances, particularly in the nanoparticle range, or influenced by structural defects/flaws or surface defects, and can thus be controlled via suitable synthesis conditions or processing of the luminescent substances. Within the scope of the present invention, decay times are preferably adjusted via concentration quenching or the addition of quenchers.

In one embodiment of the present invention, the luminescent substances of the value document system, that is, the at least first and second luminescent substance of the security feature of the first value document and the at least first luminescent substance of the second value document, are formed in such a way that they, especially the first and second luminescent substance of the first value document, are jointly excitable by the same wavelength, which especially facilitates a specific and relatively strong excitation of the luminescent substances by a spectrally comparatively narrow-band excitation pulse (light flash, e.g. laser). Here, it is advantageous when the wavelength corresponds to a shared absorption maximum in the excitation spectra of the luminescent substances or, in the case of absorption maxima that are different from one another, is able to excite at least 50% of the respective absorption maximum. Here, the excitation preferably occurs in a strong excitation band of a rare earth ion that is contained in both luminescent substances. In this way, an efficient joint excitation of the luminescent substances is possible. Said excitation band is preferably simultaneously the absorption maximum of the respective excitation spectra or an absorption band that reaches at least 50% of the absorption maximum of the excitation spectrum.

The security feature of the second value document can be present as a single substance, that is, as a single luminescent substance, or as a substance mixture composed of different luminescent substances.

In one embodiment, the single substances and the substance mixtures of the security features are homogeneously mixed powders. Said powders are preferably present in the substrate of the value document, that is, in the case of paper substrates, they are added to the paper pulp or co-introduced into the polymer or a polymer layer of the polymer substrate at manufacture of polymer substrates. Alternatively, the substance mixtures of the security features are added to a printing ink or coating and then applied to the substrate with said ink or coating.

In a further embodiment, the individual components of the substance mixtures of the security feature of the first and/or second value document are present separately, that is, a first component of the substance mixture or a first luminescent substance is present in a first sub-region of the first and/or, if applicable, second value document, for example in the paper pulp, and a second component of the substance mixture or a second luminescent substance is present in a second sub-region of the first and/or, if applicable, second value document, for example in a printing layer over the paper pulp. Here, the different sub-regions must be spatially at least partially overlapping in reflected light and/or transmitted light such that both components can be measured simultaneously. Such a security feature having separately introduced luminescent substances exhibits, when the spatially overlapping regions are measured, an analogous emission spectrum to a homogeneous mixture.

Thus, the security feature of the value document system according to the present invention can be introduced into the substrate of the first and/or second value document as, for example, a pigment, colored fiber or doping. Furthermore, the security feature can be applied to the first and/or second value document as a printing ink or coating. Furthermore, the security feature can be arranged on a substrate material in the form of a security strip, an identification thread, a colored fiber, a planchette and/or a patch. Furthermore, a combination of the possibilities listed is also conceivable.

The present invention further extends to a method for identifying (that is, detecting the presence or non-presence) of the security feature of a value document formed as described above. The method for identifying a value document of a value document system according to the present invention comprises the following steps:

exciting the first and, if applicable, second luminescent substance of the security feature of the first and/or second value document;

detecting the temporal progression of a total intensity of an emitted radiation of the first and, if applicable, second luminescent substance in at least two spectrally different detection channels, at least one detection channel encompassing at least one sub-range of the primary emission range of the first and second luminescent substance;

determining an effective decay time and/or intensity in the at least two detection channels; and identifying a coding and/or value document class from the security feature based on the determined one or more decay times and/or intensities and/or intensity ratios and/or decay time ratios of the primary emission range.

The luminescent substances of the first and/or second value document are preferably excited by means of a shared excitation pulse.

In one embodiment of the method according to the present invention, the primary emission range of the luminescent substances of the security feature of the first and/or second value document is, in each case, encompassed in multiple detection channels that differ from one another. The detection channels can each encompass a sub-range of the primary emission range. However, it is also possible that a portion of the primary emission range and/or further emissions ranges lie completely outside of all detection channels.

One embodiment of the method according to the present invention can provide that at least two detection channels lie entirely or partially within the primary emission range of the luminescent substances of the first and/or second value document. For example, the primary emission range can be divided, for example into two equal-sized halves, each half representing one detection channel. However, the detection channels need not lie exactly within the primary emission range, but can also be smaller or larger and thus protrude, for example, beyond the primary emission range, or be offset relative thereto. In particular, more than two detection channels, for example three detection channels, can lie within the primary emission range.

In one advantageous embodiment of the method according to the present invention, at least two of the detection channels correspond to the spectral ranges A, B of the security features of the at least first and if applicable, second value documents of the value document system.

In one advantageous embodiment of the method according to the present invention, the individual detection channels each encompass a wavelength range of less than 400 nm, preferably less than 250 nm, particularly preferably less than 100 nm. According to one embodiment, all detection channels are substantially of equal size, that is, they differ by less than 10% from one another in their size. The term size in this context corresponds to the spectral width (in nanometers) of the detection channel as measured by half of the spectral detection sensitivity. According to a further embodiment, the detection channels have, at least in part, different sizes (that is, one or multiple detection channels differ by more than 10% in their spectral width. For example, one detection channel has a size of 100 nm and another detection channel has a size of 150 nm. According to one embodiment, the individual detection channels are present in succession without gaps. To this end, for example, a first detection channel measures the wavelength range between 900 nm and 1000 nm, a second detection channel the wavelength range between 1000 nm and 1100 nm, and a third detection channel the wavelength range between 1100 and 1200 nm.

According to a further embodiment, one or multiple detection channels have separations from one another in which no further detection channel lies. For example, a first detection channel measures the wavelength range between 900 nm and 1000 nm, a second detection channel the wavelength range between 1000 nm and 1100 nm, and a third detection channel the wavelength range between 1150 and 1250 nm.

In one embodiment of the present invention, to check the decay time behavior, the effective decay time τ can be checked at different wavelengths or wavelength ranges (that is, in two or more detection channels). Here, the total intensity can be adjusted by using at least two data points having a monoexponential fit of the form $I(t)=A \cdot e^{-t/\tau}$ (decay quotient). This thus represents an approximation of actually potentially more complex temporal progressions. This is a very fast and simple measurement method that can be applied through the inventive choice of luminescent substances or luminescent substance properties.

In contrast to combinations of luminescent substances in the background art, as are known, for example, from the document U.S. Pat. No. 9,046,486 B2, advantageously, no complex detection methods are necessary to obtain increased security. Furthermore, organic dye molecules, in particular, have broader emission spectra compared with inventive luminescent substances based on inorganic matrix-based phosphors and significantly shorter decay times, which are often in the nanosecond range. Furthermore, they have significantly smaller Stoke's shifts. Said properties are disadvantageous for a readout or a decay time check. The method according to the present invention thus facilitates a relatively simple, fast and reliable detection of the security feature.

BRIEF DESCRIPTION OF THE DRAWINGS

The invention is further explained in the following by way of example based on the drawings. Shown are.

DETAILED DESCRIPTION OF VARIOUS EMBODIMENTS

Figure 1A:
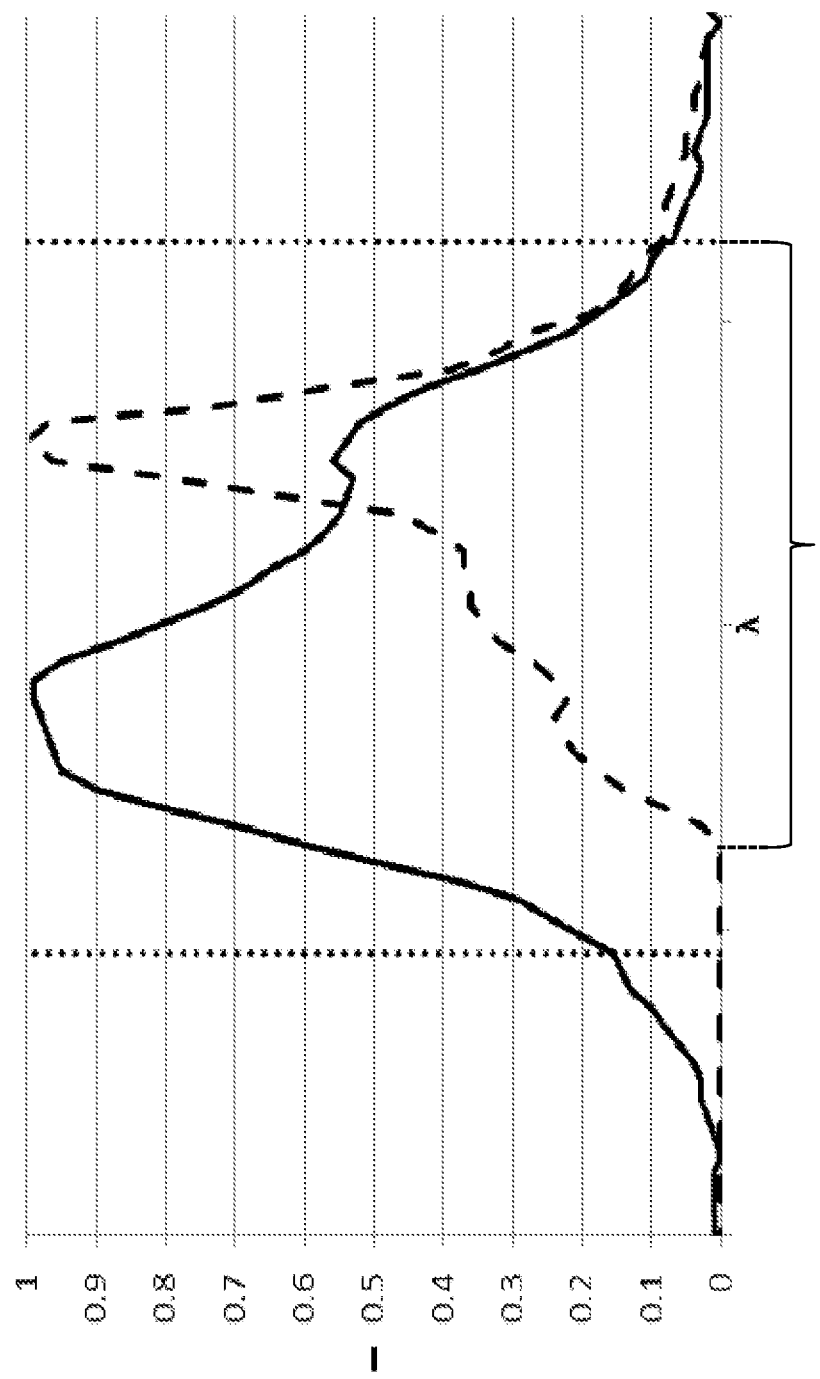
FIG. 1A two single-substance emission spectra and their overlap range ÜB.
Figure 1B:
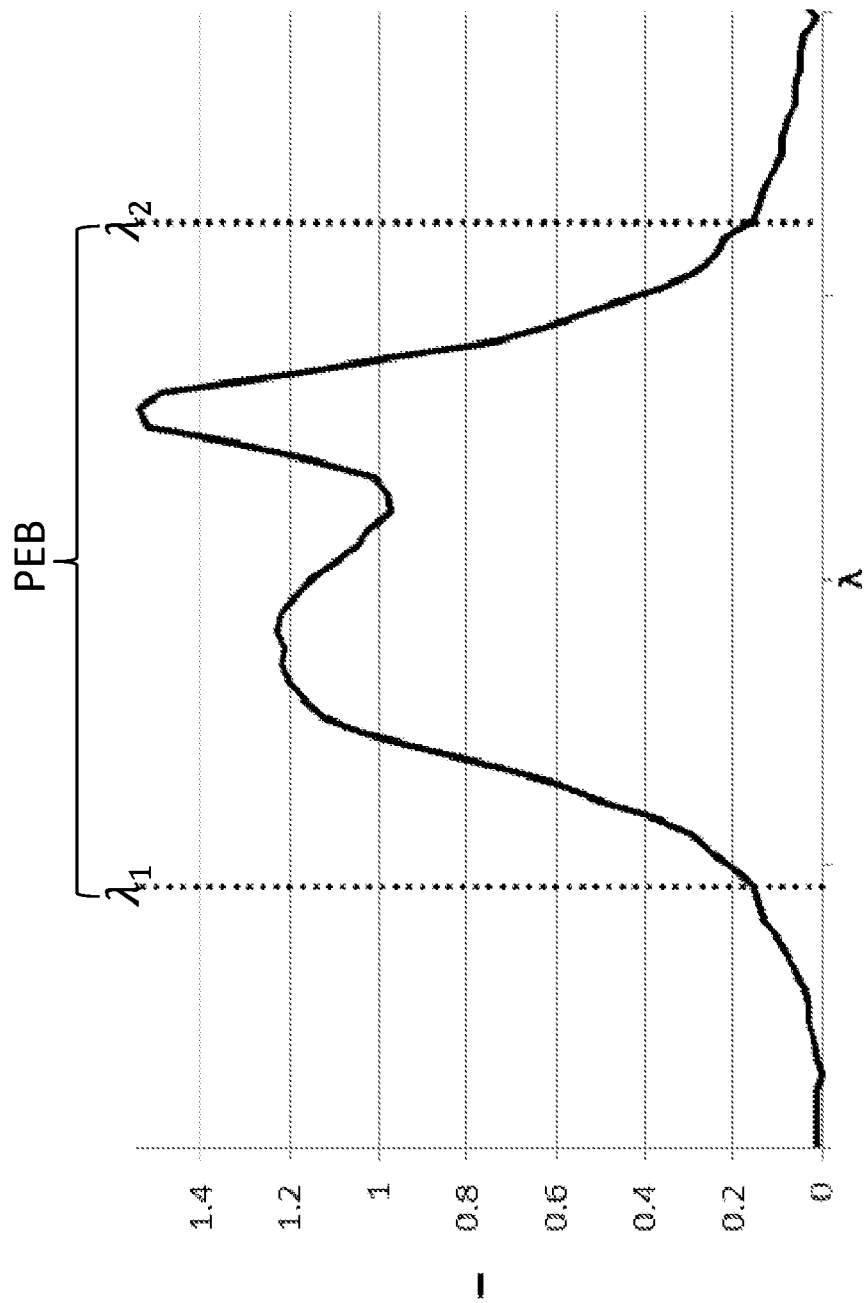
FIG. 1B the resulting emission spectrum of the mixture of the single substances in FIG. 1A and its primary emission range PEB.
Figure 2:
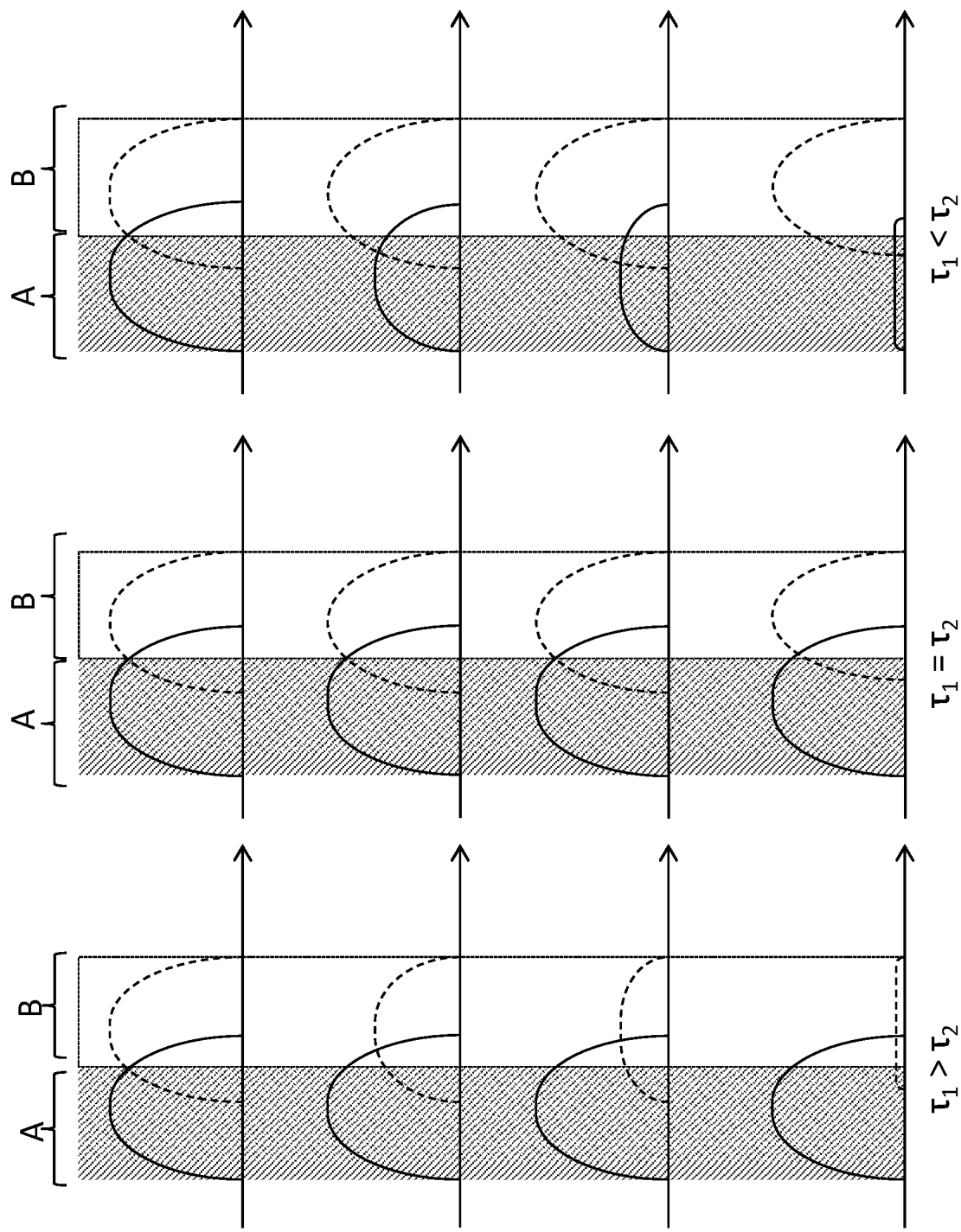
FIG. 2 schematically, the temporal evolution of two single-substance emission spectra for the different cases $\tau_1 > \tau_2$, $\tau_1 = \tau_2$ and $\tau_1 < \tau_2$.

FIG. 2 shows, schematically, the temporal evolution of two single-substance emission spectra for the different cases $\tau_1 > \tau_2$, $\tau_1 = \tau_2$ ανδ $\tau_1 < \tau_2$. Here, the emitted (individual) intensity of two substances S1 and S2 in the primary emission range is plotted against the wavelength. The temporal progression of the emission bands of the two luminescent substances S1 and S2 having the two decay times $\tau_1$ and $\tau_2$, respectively, is illustrated schematically, in one case, a first luminescent substance S1 having a longer decay time $\tau_1$ (solid line), and a second luminescent substance S2, a shorter decay time $\tau_2$ (dotted line). In a second case, both the first and the second luminescent substance S1, S2 have a long decay time ($\tau_1 = \tau_2$). In a third case, a first luminescent substance S1 has a shorter decay time $\tau_1$ (solid line) and a second luminescent substance S2 a longer decay time $\tau_2$ (dotted line).

To check a security feature having luminescent substances S1 and S2 having individual decay times $\tau_1$ and $\tau_2$, respectively, different spectral ranges A, B can be analyzed (via corresponding detection channels K_A, K_B). Here, the same emission spectrum is separated for the three cases into two different detection channels K_A, K_B each, the temporal progression of the spectral intensity resulting from the diagrams arranged, in each case, above or below one another (from top to bottom).

In the observation period, the spectral intensity of the emission band having the longer decay time evidently remains unchanged, whereas the spectral intensity of the emission band having the shorter decay time decreases sharply with time.

In one embodiment, the detection channels K_A and K_B together cover the primary emission range (each marked in the diagrams by a hatched range A and an outlined range B). Accordingly, different fractions of the emission bands of the first and second luminescent substance are included in each of the detection channels K_A and K_B. In the first case, K_A encompasses more emission fractions of the slow-decaying luminescent substance S1 and fewer emission fractions of the fast-decaying luminescent substance S2. The total decay time measured in the detection channel K_A is thus relatively long. In contrast to this, the detection channel K_B includes more emission fractions of the fast-decaying luminescent substance S2 and fewer emission fractions of the slow-decaying luminescent substance S1. The total decay time measured in the detection channel K_B is thus relatively short.

In the second case, both luminescent substances S1 and S2 are slow decaying and have the same decay time. The same long total decay time is therefore measured in both detection channel K_A and detection channel K_B.

In the third case, channel K_A includes more emission fractions of the fast-decaying luminescent substance S1 and fewer emission fractions of the slow-decaying luminescent substance S2. Thus, the total decay time measured in the detection channel K_A is relatively short and the total decay time measured in the detection channel K_B is relatively long.

Contrary to this simplified diagram, it is also possible to work with more than two spectral ranges (detection channels), for example three detection channels. Furthermore, said detection channels are normally not, as schematically depicted here, clearly separated, but are shaped by the spectral progression of the sensitivity curve of the detector or the filter curve of a filter used in the detector.

The present invention describes a value document system having special security features, consisting of a special combination of at least two luminescent substances whose emission spectra partially overlap. In this way, through an inventive selection of suitable substances and substance properties, a value document system having advantageous properties can be produced:

- increased number of codings
- improved counterfeit security due to more complicated analysis and imitation (exotic spectra, . . . )
- detection and resolvability possible with an economical, simple sensor having few, e.g. 2, spectral channels
- improved manufacturability due to scale effects and favorable substance properties.

Furthermore, the properties are chosen in such a way that a check is also possible at high transport speeds of the banknote.

In the following exemplary embodiments, the different luminescent substances are referred to qualitatively as "slow decaying" or "fast decaying". This means that the "fast-decaying" substances have a significantly shorter decay time relative to the "slow-decaying" substances of the same example. Thus, it does not mean a comparison between substances from different examples. Quantitative statements on decay times of the luminescent substances and their mixtures are given by the V and S values in the examples.

In the following exemplary embodiments, different luminescent substances are combined to form substance mixtures. Here, a designation such as "50% A, 50% C" means that both luminescent substance A and luminescent substance B were used in such a ratio that their individual intensity each contributes 50% to the total intensity. It does not necessarily mean that the two luminescent substances were used in the substance mixture in the same mass fraction. An alternative simple method for manufacturing such substance mixtures is, for example, to first dilute the individual luminescent substances with a non-luminescent filler in such a way that all (diluted) luminescent substances have the same individual intensity. In this case, the percentages indicated then correspond to the respective mass fractions of the (diluted) luminescent substances in the substance mixtures.

Figure 3:
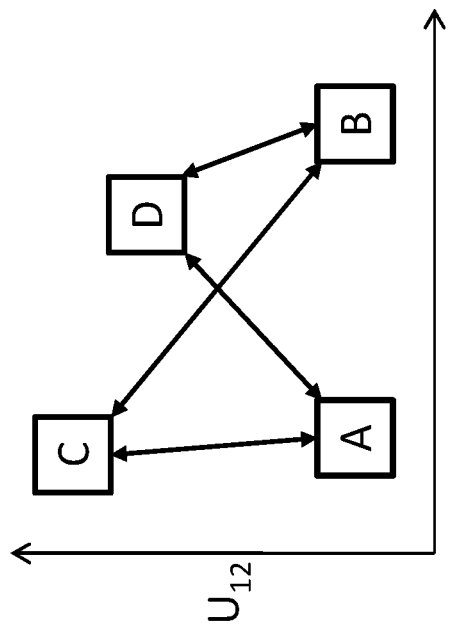
FIG. 3 A-D schematically, combinations of different luminescent substances based on their respective $U_{12}$ and $S_{12}$ values.
Figure 3:
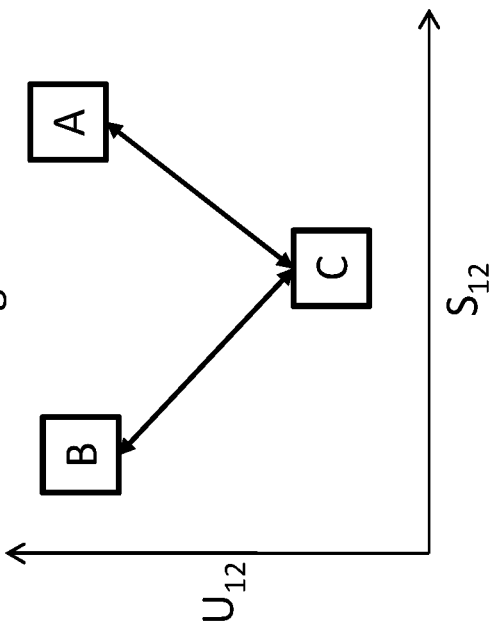
Figure 3:
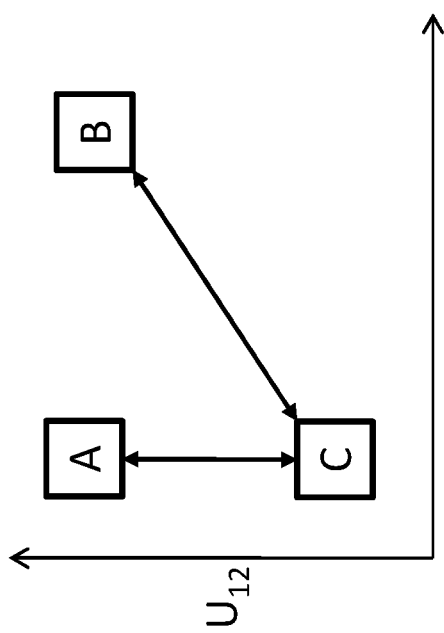
Figure 3:
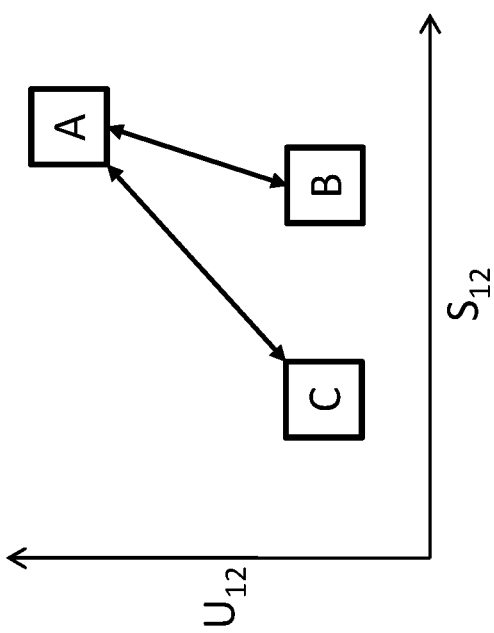

FIGS. 3A-D show schematic exemplary embodiments, namely example 1 (FIG. 3A), example 2 (FIG. 3B), example 3 (FIG. 3C) and example 4 (FIG. 3D). The exemplary embodiments relate to luminescent substances A, B, C and D.

Said substances are listed in the diagrams based on their respective $U_{12}$ and $S_{12}$ values. Here, the double arrows denote which of the spectrally complementary luminescent substances are mixed with one another to produce additional codings within the scope of the respective exemplary embodiment. However, the double arrows do not necessarily denote the progression of the $U_{12}$ and $S_{12}$ values of such mixtures, but rather are purely symbolic. The precise $U_{12}$ and $S_{12}$ values of the respective mixtures can be found in the corresponding tables in the exemplary embodiments. Here, the $U_{12}$ and $S_{12}$ values are plotted by way of example for better visualization of the exemplary embodiments. In addition to the $U_{12}$ and $S_{12}$ values, there exist further values, especially the $V_{12}$ values, which are used to separate the different codings, but were not plotted here. Within the scope of the exemplary embodiments, a coding is also referred to as a "code".

A first exemplary embodiment according to the present invention relates to a value document system having luminescent substances that are based on neodymium. To generate the value document system, two lutetium aluminum garnets doped with different amounts of neodymium and an yttrium oxysulfide doped with neodymium are used:
Luminescent substance A: LuAG:Nd, fast decaying
Luminescent substance B: LuAG:Nd, slow decaying
Luminescent substance C: $Y_2O_2S$:Nd, fast decaying When excited at 810 nm, the luminescent substances each exhibit a complex emission spectrum composed of multiple bands in the 1030-1130 nm range.

The emission spectrum is divided into three spectral ranges, which correspond to the detection channels K1, K2, K3 of the sensor. The total intensities detected in the respective spectral ranges are accordingly referred to as $I\_1$, $I\_2$, $I\_3$, and the total decay times as $\tau\_1$, $\tau\_2$, $\tau\_3$. Here, the spectral ranges span the following wavelength ranges:
K1: 1050-1075 nm→$I\_1$, $\tau\_1$
K2: 1175-1100 nm→$I\_2$, $\tau\_2$
K3: 1100-1125 nm→$I\_3$, $\tau\_3$ To differentiate the different codings of the value document system, the intensity ratios U, decay time ratios V and the decay time sum S between the different detection channels are used. These can be adjusted by combining one of the two luminescent substances A or B with the luminescent substance C. In addition, the pure single substances can be differentiated from such substance mixtures.

Here, $U_{12}$, for example, refers to the intensity ratio between K1 and K2:

$$U_{12}=I\_1/I\_2$$

Analogously:

$$U_{23}=I\_2/I\_3$$

$$U_{13}=I\_1/I\_3$$

$$V_{12}=\tau\_1/\tau\_2$$

$$V_{13}=\tau\_1/\tau\_3$$

$$V_{23}=\tau\_2/\tau\_3$$

$$S_{12}=\tau\_1+\tau\_2$$

$$S_{13}=\tau\_1+\tau\_3$$

$$S_{23}=\tau\_2+\tau\_3$$

The decay times specified in this exemplary embodiment are effective decay times. To determine them, the luminescent substances or substance mixtures are excited by an excitation pulse, an intensity is determined after a first waiting time has lapsed, a further intensity is determined after a second waiting time has lapsed, and the effective decay time is determined from the intensity difference in the first and the second waiting time. For this, within the scope of example 1, the intensity values $I_{100}$ are measured after 100 μs and $I_{300}$ after 300 μs and the effective decay time τ determined as follows:

$$\tau=-200\ \mu s/\ln(I_{300}/I_{100})$$

If the intensity values at two other times, for example, are taken as the basis, or another algorithm is applied to determine the effective decay times, then other total decay times result. Thus, to reproduce the measurement data or test criteria of such inventive features, it is necessary to know the measurement parameters precisely, which significantly increases the protective effect.

| Code | Luminescent substances used | $U_{12}$ | $U_{13}$ | $U_{23}$ | $V_{12}$ | $V_{13}$ | $V_{23}$ | $S_{12}$ [μs] | $S_{13}$ [μs] | $S_{23}$ [μs] |
|---|---|---|---|---|---|---|---|---|---|---|
| 1 | 100% A | 4.33 | 2.89 | 0.67 | 1 | 1 | 1 | 178 | 178 | 178 |
| 2 | 67% A, 33% C | 1.45 | 2.78 | 1.92 | 1 | 1 | 1 | 178 | 178 | 178 |
| 3 | 50% A, 50% C | 0.95 | 2.70 | 2.85 | 1 | 1 | 1 | 178 | 178 | 178 |

-continued

| Code | Luminescent substances used | $U_{12}$ | $U_{13}$ | $U_{23}$ | $V_{12}$ | $V_{13}$ | $V_{23}$ | $S_{12}$ [µs] | $S_{13}$ [µs] | $S_{23}$ [µs] |
|---|---|---|---|---|---|---|---|---|---|---|
| 4 | 33% A, 67% C | 0.63 | 2.59 | 4.11 | 1 | 1 | 1 | 178 | 178 | 178 |
| 5 | 100% C | 0.26 | 2.21 | 8.41 | 1 | 1 | 1 | 178 | 178 | 178 |
| 6 | 100% B | 4.27 | 3.07 | 0.72 | 1 | 1 | 1 | 562 | 562 | 562 |
| 7 | 67% B, 33% C | 1.45 | 2.92 | 2.02 | 1.62 | 1.02 | 0.62 | 423 | 518 | 416 |
| 8 | 50% B, 50% C | 0.95 | 2.82 | 2.97 | 1.84 | 1.04 | 0.56 | 380 | 483 | 370 |
| 9 | 33% B, 67% C | 0.63 | 2.68 | 4.24 | 1.93 | 1.06 | 0.55 | 337 | 431 | 323 |

The codes 1 to 9 can be differentiated from one another based on their U, V and S values, such that it is possible to set up a value document system with them.

Example 1a: Value Document System Having 9 Codings

The single substances or substance mixtures of codes 1 to 9 are used to secure one type of value document each. For example, code 1 is added to the paper pulp of a first currency, code 2 is added to the paper pulp of a second currency, code 3 is added to the paper pulp of a third currency, etc., permitting a total of 9 different currencies to be furnished with an individual coding.

Example 1b: Value Document System Having 2 Codings

The substance mixture of code 2 is introduced into the paper pulp of a first currency. The substance mixture of code 3 is introduced into the paper pulp of a second currency. The two currencies can be differentiated from one another based on their U, V and S values.

Example 1c: Value Document System Having 2 Codings

The substance mixture of code 4 is introduced into the paper pulp of a first currency. The substance mixture of code 9 is introduced into the paper pulp of a second currency. The two currencies can be differentiated from one another based on their U, V and S values.

Example 1d: Value Document System Having 3 Codings

The substance mixture of code 7 is mixed into the printing ink of a first currency and imprinted. The substance mixture of code 8 is mixed into the printing ink of a second currency and imprinted. The substance mixture of code 9 is mixed into the printing ink of a third currency and imprinted. The three currencies can be differentiated from one another based on their U, V and S values.

In a further, second exemplary embodiment, a value document system having luminescent substances based on ytterbium is described. Here, two lutetium aluminum garnets doped with different amounts of ytterbium, an yttrium phosphate doped with ytterbium and a gadolinium oxysulfide doped with ytterbium are used:

Luminescent substance A: LuAG:Yb/fast decaying
Luminescent substance B: LuAG:Yb/slow decaying
Luminescent substance C: $Gd_2O_2S$:Yb/fast decaying
Luminescent substance D: $YPO_4$:Yb/slow decaying When excited at 945 nm, the luminescent substances exhibit an emission in the 950-1100 nm range.

The emission spectrum is divided into two spectral ranges, which correspond to the detection channels K1, K2 of the sensor. The total intensities detected in the respective spectral ranges are accordingly referred to as I_1 and I_2, and the total decay times as τ_1 and τ_2. Here, the spectral ranges span the following wavelength ranges:

K1: 950-1000 nm→I_1, τ_1
K2: 1000-1100 nm→I_2, τ_2

To differentiate the different codings of the value document system, the intensity ratio U, decay time ratio V and the decay time sum S of the two detection channels are used. These can be adjusted by combining one of the two luminescent substances A or B with one of the two luminescent substances C or D. In addition, the pure single substances can be differentiated from such substance mixtures.

Here, $U_{12}$, for example, refers to the intensity ratio between K1 and K2:

$$U_{12} = I\_1/I\_2$$

Analogously:

$$V_{12} = \tau\_1/\tau\_2$$

$$S_{12} = \tau\_1 + \tau\_2$$

The decay times indicated in the example are effective decay times. To determine them, the luminescent substances or substance mixtures are excited by an excitation pulse, an intensity is determined after a first waiting time has lapsed, an intensity is determined after a second waiting time has lapsed, and the effective decay time is determined from the intensity difference in the first and the second waiting time. For this, within the scope of example 2, the intensity values $I_{100}$ are measured after 100 µs and $I_{300}$ after 300 µs and the effective decay time τ determined as follows:

$$\tau = -200 \text{ µs}/\ln(I_{300}/I_{100})$$

If the intensity values at two other times, for example, are taken as the basis, or another algorithm is applied to determine the effective decay times, then other total decay times result. Thus, to reproduce the measurement data or test criteria of such inventive features, it is necessary to know the measurement parameters precisely, which significantly increases the protective effect.

| Code | Luminescent substances used | $U_{12}$ | $V_{12}$ | $S_{12}$ [µs] |
|---|---|---|---|---|
| 2-1 | 100% A | 0.38 | 1 | 400 |
| 2-2 | 100% B | 0.37 | 1 | 1820 |
| 2-3 | 100% C | 5.55 | 1 | 360 |
| 2-4 | 100% D | 2.35 | 1 | 1440 |
| 2-5 | 25% B, 75% D | 1.46 | 0.92 | 1535 |
| 2-6 | 50% B, 50% D | 0.94 | 0.90 | 1614 |
| 2-7 | 75% B, 25% D | 0.60 | 0.92 | 1696 |
| 2-8 | 25% A, 75% C | 2.38 | 0.95 | 374 |
| 2-9 | 50% A, 50% C | 1.28 | 0.94 | 381 |

-continued

| Code | Luminescent substances used | $U_{12}$ | $V_{12}$ | $S_{12}$ [µs] |
|---|---|---|---|---|
| 2-10 | 75% A, 25% C | 0.72 | 0.95 | 388 |
| 2-11 | 25% A, 75% D | 1.47 | 1.50 | 1035 |
| 2-12 | 50% A, 50% D | 0.96 | 1.69 | 805 |
| 2-13 | 75% A, 25% D | 0.62 | 1.55 | 607 |
| 2-14 | 25% B, 75% C | 2.36 | 0.43 | 710 |
| 2-15 | 50% B, 50% C | 1.26 | 0.40 | 962 |
| 2-16 | 75% B, 25% C | 0.70 | 0.50 | 1222 |

The codes 2-1 to 2-16 can be differentiated from one another based on their U, V and S values, such that it is possible to set up a value document system with them.

Example 2a: Value Document System Having 16 Codings

The single substances or substance mixtures of codes 2-1 to 2-16 are used to secure one type of value document each. For example, code 2-1 is added to the paper pulp of a first currency, code 2-2 is added to the paper pulp of a second currency, code 2-3 is added to the paper pulp of a third currency, etc., permitting a total of 16 different currencies to be furnished with an individual coding.

Example 2b: Value Document System Having 2 Codings

The substance mixture of code 2-12 is introduced into the paper pulp of a first currency. The substance mixture of code 2-15 is introduced into the paper pulp of a second currency. The two currencies can be differentiated from one another based on their U, V and S values.

A further, third exemplary embodiment relates to a value document system having luminescent substances that are based on erbium. Here, the following three substances are used: an yttrium aluminum garnet doped with erbium, an yttrium vanadate doped with erbium without an additional quencher, and an yttrium vanadate doped with erbium with a low samarium codoping to reduce the decay time:

Luminescent substance A: YAG:Er/slow decaying
Luminescent substance B: YVO$_4$:Er/slow decaying
Luminescent substance C: YVO$_4$:Er, Sm/fast decaying When excited at a wavelength of 970 nm, the luminescent substances exhibit an emission in the 1400-1700 nm range.

The emission spectrum is divided into three spectral ranges, which correspond to the detection channels K1, K2, K3 of the sensor. The total intensities detected in the respective spectral ranges are accordingly referred to as I_1, I_2, I_3, and the total decay times as τ_1, τ_2, τ_3. Here, the spectral ranges span the following wavelength ranges:

K1: 1400-1500 nm→I_1, τ_1
K2: 1500-1600 nm→I_2, τ_2
K2: 1600-1700 nm→I_3, τ_3

To differentiate the different codings of the value document system, the intensity ratio U, decay time ratio V and the decay time sum S of the two detection channels are used. These can be adjusted by combining the luminescent substance A with one of the luminescent substances B or C. In addition, the pure single substances can be differentiated from substance mixtures composed of the single substances.

Here, $U_{12}$, for example, refers to the intensity ratio between K1 and K2:

$$U_{12}=I\_1/I\_2$$

Analogously:

$$U_{23}=I\_2/I\_3$$

$$U_{13}=I\_1/I\_3$$

$$V_{12}=\tau\_1/\tau\_2$$

$$V_{13}=\tau\_1/\tau\_3$$

$$V_{23}=\tau\_2/\tau\_3$$

$$S_{12}=\tau\_1+\tau\_2$$

$$S_{13}=\tau\_1+\tau\_3$$

$$S_{23}=\tau\_2+\tau\_3$$

The decay times indicated in the example are effective decay times. To determine them, the luminescent substances or substance mixtures are excited by an excitation pulse, an intensity is determined after a first waiting time has lapsed, an intensity is determined after a second waiting time has lapsed, and the effective decay time is determined from the intensity difference in the first and the second waiting time. For this, within the scope of example 3, the intensity values I$_{100}$ are measured after 100 µs and I$_{500}$ after 500 µs and the effective decay time τ determined as follows:

$$\tau=-400\ \mu s/\ln(I_{500}/I_{100})$$

If the intensity values at two other times, for example, are taken as the basis, or another algorithm is applied to determine the effective decay times, then other total decay times result. Thus, to reproduce the measurement data or test criteria of such inventive features, it is necessary to know the measurement parameters precisely, which significantly increases the protective effect.

| Code | Luminescent substances used | $U_{12}$ | $U_{13}$ | $U_{23}$ | $V_{12}$ | $V_{13}$ | $V_{23}$ | $S_{12}$ [µs] | $S_{13}$ [µs] | $S_{23}$ [µs] |
|---|---|---|---|---|---|---|---|---|---|---|
| 3-1 | 100% A | 0.40 | 0.40 | 0.99 | 1 | 1 | 1 | 2400 | 2400 | 2400 |
| 3-2 | 100% B | 0.11 | 1.26 | 11.91 | 1 | 1 | 1 | 2200 | 2200 | 2200 |
| 3-3 | 100% C | 0.11 | 1.26 | 11.91 | 1 | 1 | 1 | 800 | 800 | 800 |
| 3-4 | 25% A, 75% B | 0.15 | 0.69 | 4.65 | 1.02 | 0.98 | 0.96 | 2250 | 2302 | 2278 |
| 3-5 | 50% A, 50% B | 0.20 | 0.52 | 2.56 | 1.03 | 0.98 | 0.96 | 2295 | 2349 | 2316 |
| 3-6 | 75% A, 25% B | 0.28 | 0.44 | 1.56 | 1.02 | 0.99 | 0.97 | 2342 | 2378 | 2352 |
| 3-7 | 25% A, 75% C | 0.15 | 0.69 | 4.65 | 1.29 | 0.74 | 0.57 | 1071 | 1419 | 1282 |
| 3-8 | 50% A, 50% C | 0.20 | 0.52 | 2.56 | 1.41 | 0.80 | 0.56 | 1374 | 1814 | 1581 |
| 3-9 | 75% A, 25% C | 0.28 | 0.44 | 1.56 | 1.32 | 0.89 | 0.67 | 1759 | 2127 | 1882 |

The codes 3-1 to 3-9 can be differentiated from one another based on their U, V and S values, such that it is possible to set up a value document system with them.

Example 3a: Value Document System Having 9 Codings

The single substances or substance mixtures of codes 3-1 to 3-9 are used to secure one type of value document each. For example, code 3-1 is added to the paper pulp of a first currency, code 3-2 is added to the paper pulp of a second currency, code 3-3 is added to the paper pulp of a third currency, etc., permitting a total of nine different currencies to be furnished with an individual coding.

Example 3b: Value Document System Having 2 Codings

The substance mixture of code 3-7 is introduced into the paper pulp of a first currency. The substance mixture of code 3-9 is introduced into the paper pulp of a second currency. The two currencies can be differentiated from one another based on their U, V and S values.

In a further, fourth exemplary embodiment according to the present invention, it is a value document system having luminescent substances, based on thulium and holmium. Here, the following three substances are used: a lutetium aluminum garnet doped with thulium without additional quencher, a lutetium aluminum garnet doped with thulium with a low praseodymium codoping to reduce the decay time, and an yttrium oxysulfide doped with neodymium, ytterbium and holmium.

Luminescent substance A: LuAG:Tm/slow decaying
Luminescent substance B: LuAG:Tm, Pr/fast decaying
Luminescent substance C: $Y_2O_2S$:Nd, Yb, Ho/slow decaying When excited at 810 nm, the luminescent substances exhibit an emission in the 1600-2100 nm range.

The emission spectrum is divided into two spectral ranges, which correspond to the detection channels K1, K2 of the sensor. The total intensities detected in the respective spectral ranges are accordingly referred to as I_1 and I_2, and the total decay times as $\tau\_1$ and $\tau\_2$. Here, the spectral ranges span the following wavelength ranges:

K1: 1500-2000 nm→I_1, $\tau\_1$
K2: 2000-2100 nm→I_2, $\tau\_2$

To differentiate the different codings of the value document system, the intensity ratio U, the decay time ratio V and the decay time sum S of the two detection channels are used. These can be adjusted by combining one of the two luminescent substances A or B with luminescent substance C. In addition, the pure single substances can be differentiated from such substance mixtures.

Here, $U_{12}$, for example, refers to the intensity ratio between K1 and K2:

$$U_{12} = I\_1/I\_2$$

Analogously:

$$V_{12} = \tau\_1/\tau\_2$$

$$S_{12} = \tau\_1 + \tau\_2$$

The decay times indicated in the example are effective decay times. To determine them, the luminescent substances or substance mixtures are excited by an excitation pulse, an intensity is determined after a first waiting time has lapsed, an intensity is determined after a second waiting time has lapsed, and the effective decay time is determined from the intensity difference in the first and the second waiting time. For this, within the scope of example 4, the intensity values Iwo are measured after 100 μs and $I_{500}$ after 500 μs and the effective decay time τ determined as follows:

$$\tau = -400 \ \mu s / \ln(I_{500}/I_{100})$$

If the intensity values at two other times, for example, are taken as the basis, or another algorithm is applied to determine the effective decay times, then other total decay times result. Thus, to reproduce the measurement data or test criteria of such inventive features, it is necessary to know the measurement parameters precisely, which significantly increases the protective effect.

| Code | Luminescent substances used | $U_{12}$ | $V_{12}$ | $S_{12}$ [μs] |
|---|---|---|---|---|
| 4-1 | 100% A | 9.34 | 1 | 2400 |
| 4-2 | 100% B | 9.09 | 1 | 1200 |
| 4-3 | 100% C | 0.80 | 1 | 1800 |
| 4-4 | 25% A, 75% C | 1.27 | 1.10 | 1920 |
| 4-5 | 50% A, 50% C | 2.07 | 1.16 | 2024 |
| 4-6 | 75% A, 25% C | 3.73 | 1.16 | 2139 |
| 4-7 | 25% B, 75% C | 1.27 | 0.87 | 1640 |
| 4-8 | 50% B, 50% C | 2.06 | 0.81 | 1529 |
| 4-9 | 75% B, 25% C | 3.69 | 0.81 | 1413 |

The codes 4-1 to 4-9 can be differentiated from one another based on their U, V and S values, such that it is possible to set up a value document system with them.

Example 4a: Value Document System Having 9 Codings

The single substances or substance mixtures of codes 4-1 to 4-9 are used to secure one type of value document each. For example, code 4-1 is added to the paper pulp of a first currency, code 4-2 is added to the paper pulp of a second currency, code 4-3 is added to the paper pulp of a third currency, etc., permitting a total of nine different currencies to be furnished with an individual coding.

Example 4b: Value Document System Having 2 Codings

The substance mixture of code 4-5 is introduced into the paper pulp of a first currency. The substance mixture of code 4-8 is introduced into the paper pulp of a second currency. The two currencies can be differentiated from one another based on their U, V and S values.

The invention claimed is:
1. A value document system, comprising at least a first value document and a second value document,
the first value document comprising a security feature composed of a combination of at least a first and a second luminescent substance,
  i. the first luminescent substance of the security feature of the first value document being a luminescent substance of a first substance class, comprising doped garnet structures;
  ii. the second luminescent substance of the security feature of the first value document being a luminescent substance of a second substance class, comprising doped rare earth oxysulfides, doped rare earth-phosphates and doped rare earth vanadates;

iii. the first and the second luminescent substance of the security feature of the first value document having partially overlapping emission spectra;
iv. the first and the second luminescent substance of the security feature of the first value document being jointly excitable at one wavelength;
v. the first and the second luminescent substance of the security feature of the first value document having a decay time of less than 5 ms; and
vi. the first and second luminescent substance of the security feature of the first value document being formed in such a way that a primary emission range of their partially overlapping emission spectra is dividable into two different, directly adjacent spectral ranges, namely a first and a second spectral range, which have a width of at least 50 nm and a maximum of 500 nm;

the second value document comprising a security feature having at least a first luminescent substance from the first substance class or from the second substance class having a decay time of less than 5 ms, whose emission is at least partially in at least one of the adjacent spectral ranges A, B; and the security feature of the first value document having at least a different intensity ratio of the emission, a different decay time ratio and a different decay time sum in the two adjacent spectral ranges A, B compared with the security feature of the second value document;

wherein the luminescent substances of the first substance class are selected from doped yttrium aluminum garnets (YAG), lutetium aluminum garnets (Lu-AG), gadolinium gallium garnets (GGG), gadolinium scandium gallium garnets (GSGG), yttrium scandium gallium garnets (YSGG), calcium niobium gallium garnets (CNGG), gadolinium scandium aluminum garnets (GSAG), calcium lithium niobium gallium garnets (CLNGG), transition-metal-containing garnet structures, yttrium iron garnets (YIG) or mixed variants of these garnet structures.

2. The value document system according to claim 1, the different intensity ratios of the emission, the different decay time ratios and/or the different decay time sums in the spectral ranges A, B of, in each case, the first and second value document being assigned to a coding and/or a value document identifier of the first and/or second value document.

3. The value document system according to claim 2, wherein the coding or value document identifier of the first and second value document correspond to one denomination and/or one value each.

4. The value document system according to claim 1, the first and second luminescent substances in the security feature of the first value document and the first luminescent substance of the security feature of the second value document having, as emission centers, the rare earths Nd, Yb or Er as the dopant.

5. The value document system according to claim 1, wherein the luminescent substances of the second substance class are selected from doped lanthanum oxysulfides, yttrium oxysulfides, gadolinium oxysulfides, lutetium oxysulfides, mixed oxysulfides based on these; and/or doped lanthanum phosphates, yttrium phosphates, gadolinium phosphates, lutetium phosphates, mixed phosphates based on these; and/or lanthanum vanadates, yttrium vanadates, gadolinium vanadates, lutetium vanadates, and/or mixed vanadates based on these.

6. The value document system according to claim 1, the degree of overlap of the partially overlapping emission spectra being greater than 5% and less than 80%.

7. The value document system according to claim 1, the security feature of the second value document comprising a combination of the first luminescent substance from the first substance class with a second luminescent substance from the second substance class or comprising a combination of the first luminescent substance from the second substance class with a second luminescent substance from the first substance class, the first and second luminescent substances of the second value document
i. having partially overlapping emission spectra;
ii. being jointly excitable at one wavelength;
iii. each having a decay time of less than 5 ms.

8. The value document system according to claim 1, the first and second luminescent substances in the security feature of the first value document, as well as the first and, if present, second luminescent substance of the second value document being jointly excitable at one wavelength.

9. The value document system according to claim 1, the first or second luminescent substance of the security feature of the first value document using the same matrix as the first luminescent substance or the, if applicable, second luminescent substance of the security feature of the second value document.

10. The value document system according to claim 1, the first and second luminescent substance of the security feature of the first value document using the same matrices as the first luminescent substance and second luminescent substance of the security feature of the second value document.

11. The value document system according to claim 1, the first and second luminescent substance of the security feature of the first value document and the first luminescent substance of the second value document using the same rare earth as the emission center.

12. The value document system according to claim 1, wherein the respective decay time of the first and second luminescent substance of the security feature of the first value document and of the first and, if applicable, second luminescent substance of the security feature of the second value document is at least 0.05 ms.

13. The value document system according to claim 1, wherein the first and second luminescent substance of the security feature of the first value document differ in their decay time by less than 10%.

14. The value document system according to claim 1, wherein the first and second luminescent substance of the security feature of the first value document differ in decay time by 10% to 50% with respect to the shortest individual decay time of the luminescent substances.

15. The value document system according to claim 1, wherein the first and second luminescent substance of the security feature of the first value document differ in decay time by at least 50% with respect to the shortest individual decay time of the luminescent substances.

16. The value document system according to claim 1, the intensity ratio of the emission being the quotient of the total intensity in the first spectral range and the total intensity in the second spectral range;
the decay time ratio being the quotient of the total decay time in the first spectral range and the total decay time in the second spectral range; and
the decay time sum being the sum of the total decay time in the first spectral range and the total decay time in the second spectral range.

17. A method for identifying a value document of a value document system according to claim 1, comprising the steps:
- a. exciting the first and, if present, second luminescent substance of the security feature;
- b. detecting the temporal progression of a total intensity of the emitted radiation of the first and, if present, second luminescent substance in at least two spectrally different detection channels, the detection channels each encompassing at least a sub-range of the primary emission range of the first and, if present, second luminescent substance; determining a decay time and/or intensity in the at least two detection channels; and
- c. identifying a value document class based on the determined one or more decay times and/or intensities and/or intensity ratios and/or decay time ratios of the primary emission range.

18. A luminescent substance set for manufacturing a value document system according to claim 1, comprising the first luminescent substance of the first value document, the second luminescent substance of the first value document and the first luminescent substance of the second value document and, if applicable, the second luminescent substance of the second value document.

* * * * *